C. E. ADAMSON.
Running Gear for Wagons.
No. 229,793.
Patented July 13, 1880.
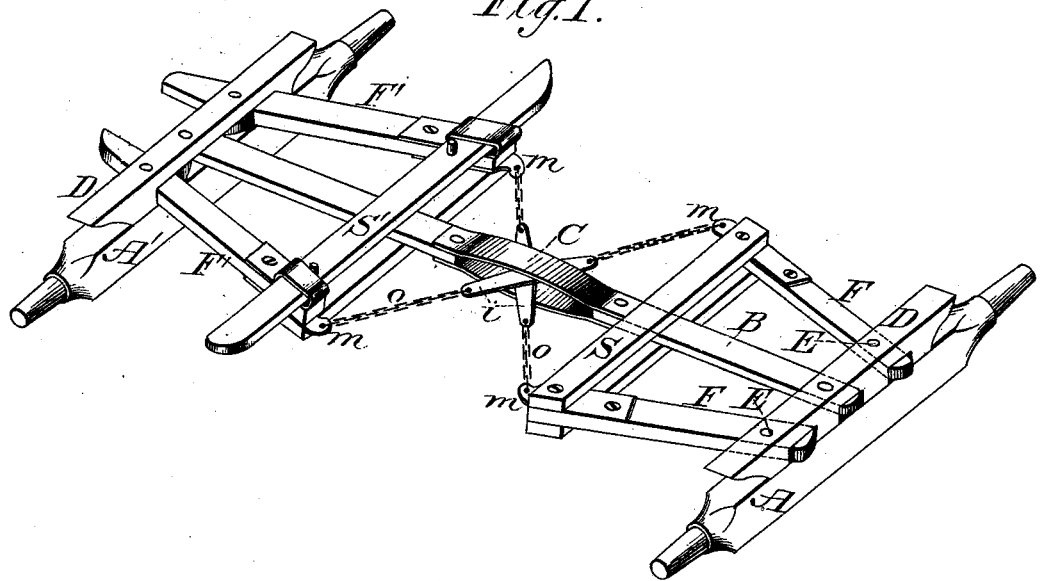
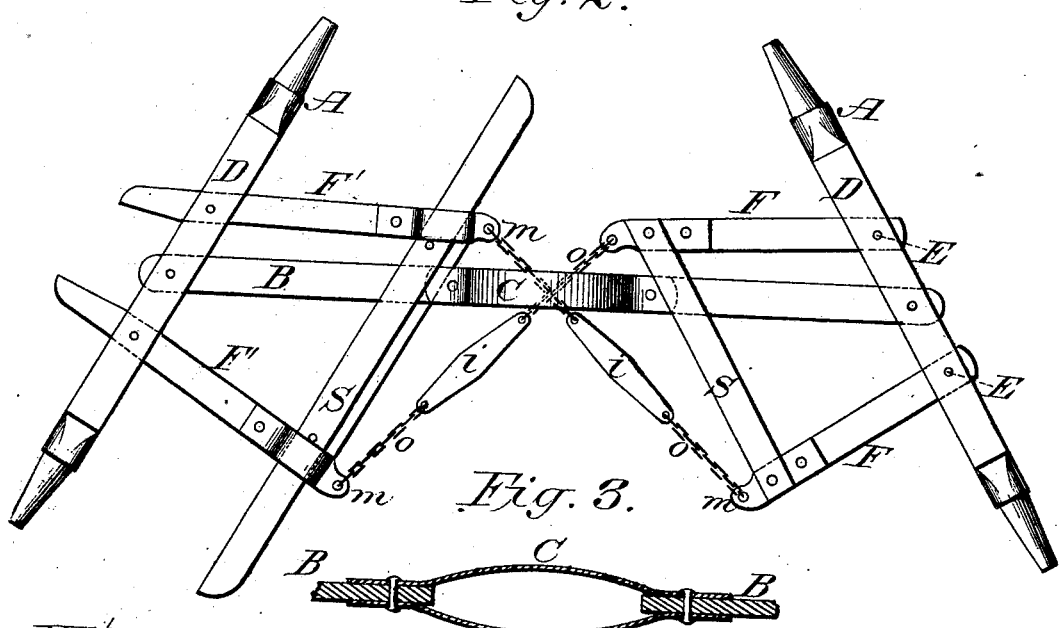
Witnesses:
O. J. Lotz
John H. Neal
Inventor:
Charles E. Adamson

UNITED STATES PATENT OFFICE.

CHARLES E. ADAMSON, OF GILMAN, INDIANA.

RUNNING-GEAR FOR WAGONS.

SPECIFICATION forming part of Letters Patent No. 229,793, dated July 13, 1880.

Application filed April 2, 1880. (Model.)

*To all whom it may concern:*

Be it known that I, CHARLES ELLSWORTH ADAMSON, of Gilman, in the county of Delaware and State of Indiana, have invented a new and useful Improvement in Running-Gear for Wagons, of which the following is a specification.

The invention relates to circle-track running-gear for wagons.

Heretofore running-gears have been constructed in such a way that when they are in the act of turning the rear wheels do not follow the track of the front wheels, but run more or less inside of the circle, or inside of the front wheels' tracks.

This method is very imperfect and objectionable for the following reasons: First, when the rear wheels do not track with front ones the draft is much heavier on the team, especially when the wheels are in the mud; second, in turning around a gate-post, stump, tree, or rut the inside rear wheel will very often strike or run into the obstruction, injuring the wagon more or less, and very often breaking off a wheel or tearing down the gate-post; third, in order to turn the common wagon around, the diameter of the circle must be twice that of a wagon the rear wheels of which follow direct in the track made by the front ones.

The object of my invention is to provide a system of gearing constructed in such a manner that the rear wheels will follow directly in the track made by the front wheels in turning or in using the wagon in any way, and to also construct the wheels all of the same size, the front ones being some higher and the rear ones lower than the wheels now in use on our common farm-wagons.

In the accompanying drawings, in which similar letters indicate like parts, Figure 1 is a perspective view, showing my invention when the wheels are aligned, or when the wagon is going straight forward. Fig. 2 shows my running-gear when in the act of turning, or when the wagon is cramped. Fig. 3 is a sectional view of the center of the coupling-pole.

A is the front axle, D the sand-board, and F the hounds, the said hounds being fastened between the axle and the sand-board by means of the gear-bolt E, and extending back from the axle and outward from the coupling-pole B. At the rear end of the said hounds is attached the sliders S, or cross-braces, the one on the under side being made solid to the end of the said hounds, and the one over the pole longer, and made so it can be slipped forward against the wheel for a brake, and also used as a step. At the rear end of the said hounds, and between the said sliders, are the connecting-plates $m$. The said plates $m$ are pivoted to the under slider and to the end of the said hounds F. In each of these plates is a hole and a pin, arranged so that the clevis on the end of the chain O is directly connected to it. The said chain O is connected a few links from the end to a metallic strap, $i$, the said strap having a similar chain connected to the other end, this chain being directly connected to the opposite corner of the rear hounds, F', the said hounds being connected to the rear axle, the same as the front hounds are connected to the front axle. The said hounds F' extend outward from the coupling-pole, and are the same length of the rear part of the front hounds, and have two slides of the same length over and under the pole B, and attached to the ends of the said hounds F' by a bolt and rivets. The said hounds F' have each a connecting-plate, $m$, to which are attached the chains $i$ and O. The said chains and straps cross each other in the section C in the coupling-pole B.

As thus constructed my apparatus is complete and can be used the same as any gearing, and it can be coupled out or up short by the links in the chains, and makes a perfect circle-track while circling or turning around.

Having thus described my invention, I claim as new and desire to secure by Letters Patent—

The metallic plates $i$, attached by chains O to the hounds, in combination with the reach B, provided with loop C, for the reception of plates $i$, all arranged and operating substantially as specified.

CHARLES ELLSWORTH ADAMSON.

Witnesses:
O. J. LOTZ,
J. H. NEAL.